United States Patent
Arana

(10) Patent No.: US 12,279,010 B2
(45) Date of Patent: Apr. 15, 2025

(54) PHOTOSENSITIVITY MITIGATION DURING DISPLAY OF CONTENT

(71) Applicant: Disney Enterprises, Inc., Burbank, CA (US)

(72) Inventor: Mark Arana, Agoura Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/092,639

(22) Filed: Jan. 3, 2023

(65) Prior Publication Data
US 2024/0223848 A1 Jul. 4, 2024

(51) Int. Cl.
H04N 7/173 (2011.01)
H04N 21/41 (2011.01)
H04N 21/44 (2011.01)

(52) U.S. Cl.
CPC ... *H04N 21/44008* (2013.01); *H04N 21/4122* (2013.01)

(58) Field of Classification Search
CPC ............ H04N 21/44008; H04N 21/4122
See application file for complete search history.

(56) References Cited

U.S. PATENT DOCUMENTS

| | | | | |
|---|---|---|---|---|
| 11,372,530 B2* | 6/2022 | Dey | .................. | G06F 3/04883 |
| 2007/0294737 A1* | 12/2007 | Edwards | .............. | H04N 21/431 |
| | | | | 725/112 |
| 2008/0281905 A1* | 11/2008 | Langer | .................. | H04L 51/224 |
| | | | | 709/203 |
| 2009/0113481 A1* | 4/2009 | Friedman | ........... | H04N 21/4532 |
| | | | | 725/46 |
| 2012/0320013 A1* | 12/2012 | Perez | ................... | H04N 9/8205 |
| | | | | 345/207 |
| 2013/0031581 A1* | 1/2013 | Narasimhan | ....... | H04N 21/4122 |
| | | | | 725/33 |
| 2013/0036442 A1* | 2/2013 | Wingert | ........... | H04N 21/42209 |
| | | | | 725/60 |
| 2015/0181291 A1* | 6/2015 | Wheatley | ............... | H04N 21/84 |
| | | | | 725/10 |
| 2018/0288478 A1* | 10/2018 | Durham | ........... | H04N 21/23424 |

(Continued)

FOREIGN PATENT DOCUMENTS

JP 2014-527359 A 10/2014

OTHER PUBLICATIONS

Search Report dated Apr. 3, 2024 for Application GB2316709.1.
(Continued)

*Primary Examiner* — Annan Q Shang
(74) *Attorney, Agent, or Firm* — Farjami & Farjami LLP

(57) ABSTRACT

There are provided systems and methods for providing photosensitivity mitigation during display of content. In one implementation, such a system includes a hardware processor and a system memory storing a software application. The hardware processor is configured to execute the software application to, while content is being displayed on a primary display for viewing by a viewer, determine that a portion of the content that is about to be displayed on the primary display may trigger a photosensitivity reaction by the viewer, generate an alert to the viewer to switch viewing the content from the primary display to viewing the content from a secondary display, and display the portion of the content on the secondary display.

20 Claims, 4 Drawing Sheets

(56) References Cited

U.S. PATENT DOCUMENTS

| | | | |
|---|---|---|---|
| 2018/0373399 A1* | 12/2018 | Battula | G06Q 10/1093 |
| 2019/0130733 A1* | 5/2019 | Hodge | G06Q 10/0639 |
| 2021/0219023 A1* | 7/2021 | Sheng | A61B 5/6801 |
| 2022/0053042 A1 | 2/2022 | Kanza et al. | |
| 2022/0182717 A1 | 6/2022 | Li et al. | |
| 2022/0284231 A1 | 9/2022 | Decrop et al. | |

OTHER PUBLICATIONS

"Photosensitive Epilepsy Analysis Tool (PEAT) User guide" University of Maryland, Oct. 2023 20 Pgs.

Toshiya Morita "Development of Technology to Prevent Influence of Images Upon Viewers" ITE Technical Report, vol. 30, No. 22, Nov. 3, 2006 4 pgs.

Laura South and Michelle A. Borkin "Photosensitive Accessibility for Interactive Data Visualizations" IEEE Transactions on Visualization and ComputerGraphics, vol. 29, Issue 1, Sep. 27, 2022 11 pgs.

* cited by examiner

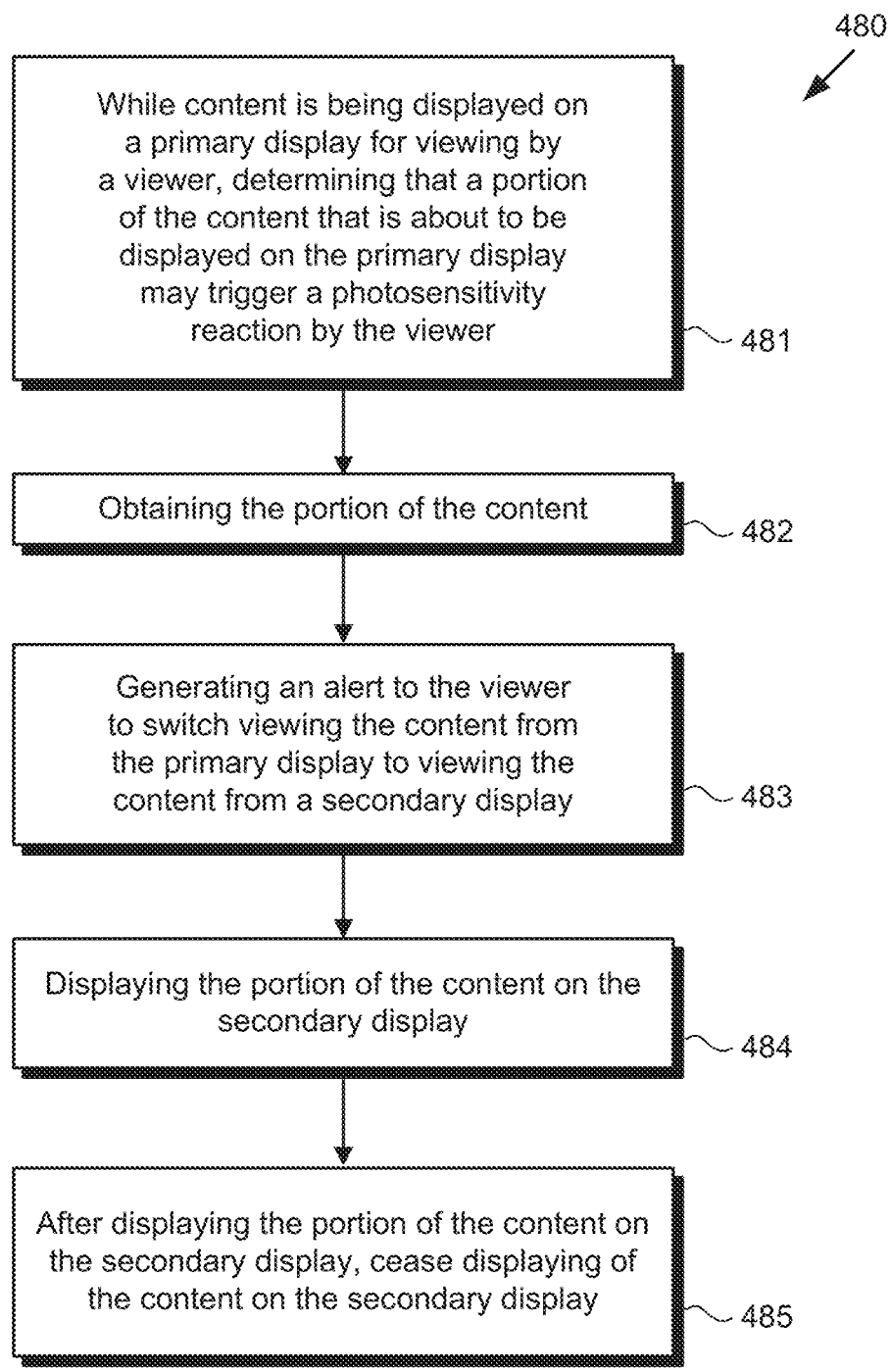

PHOTOSENSITIVITY MITIGATION DURING DISPLAY OF CONTENT

BACKGROUND

Modern movies and other cinema quality content can provide spectacular visual effects. Moreover, display features such as large ultra-high definition display screens intensify the experience of a viewer watching such content. Despite the many aesthetic advantages associated with modern high resolution content production and display technologies, for some susceptible viewers, under some viewing conditions, the rapidly shifting visual effects and vivid colors made possible by those technologies can trigger a photosensitivity reaction. Such a photosensitivity reaction may take the form of unpleasant dizziness or even terrifying vertigo, nausea, headache such as migraine, or any combination of those symptoms. Still more concerning, in relatively rare cases, a photosensitive reaction may take the form of photosensitive epilepsy including potentially life threatening seizures, even among individuals who do not suffer from classic epilepsy. These photosensitivity reactions are more common in viewers under eighteen than in adults, placing those younger viewers at greater jeopardy in the absence of a solution for mitigating the risk of experiencing a photosensitivity reaction.

BRIEF DESCRIPTION OF THE DRAWINGS

FIG. 4 is a flowchart presenting an exemplary method for use by a system to provide photosensitivity mitigation during display of content, according to one implementation.

DETAILED DESCRIPTION

Figure 1:
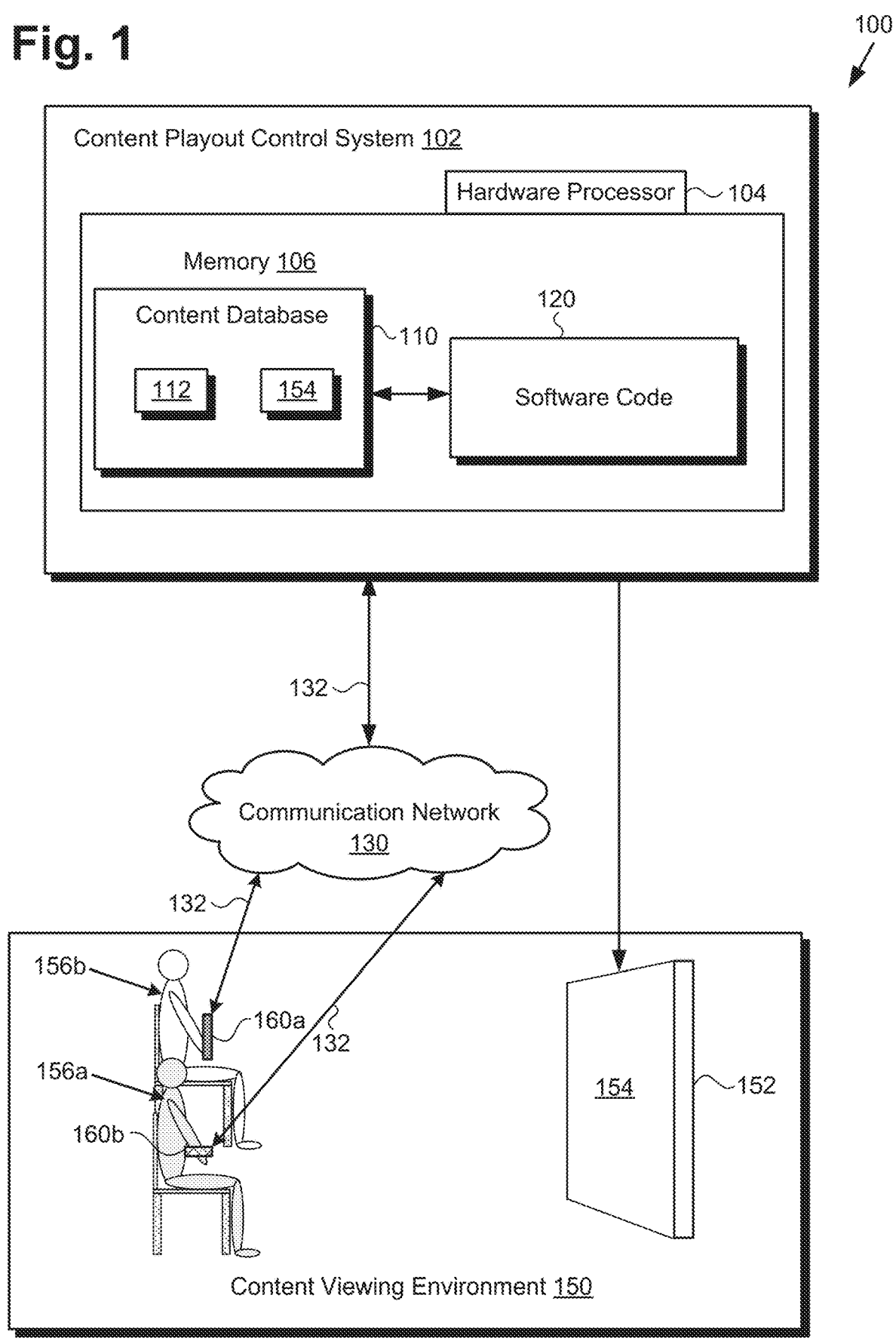
FIG. 1 shows a diagram of a use environment in which photosensitivity mitigation during display of content is performed, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing photosensitivity mitigation for an individual viewing content (hereinafter "viewer") during display of the content. As stated above, despite the many aesthetic advantages associated with modern high resolution content production and display technologies, for some susceptible viewers, under some viewing conditions, the rapidly shifting visual effects and vivid colors made possible by those technologies can trigger a photosensitivity reaction. Such a photosensitivity reaction may take the form of unpleasant dizziness or even terrifying vertigo, nausea, headache such as migraine, or any combination of those symptoms. Still more concerning, in relatively rare cases, a photosensitive reaction may take the form of photosensitive epilepsy including potentially life threatening seizures, even among individuals who do not suffer from classic epilepsy. These photosensitivity reactions are more common in viewers under eighteen than in adults, placing those younger viewers at greater jeopardy in the absence of a solution for mitigating the risk of experiencing a photosensitivity reaction.

By way of overview, the present photosensitivity mitigation solution includes determining, while content is being displayed on a primary display, that a portion of that content that is about to be displayed on the primary display may trigger a photosensitivity reaction by the viewer, and generating an alert prompting the viewer to temporarily view the content from a secondary display having a smaller screen size thus changing the field of view. The present solution further includes displaying the potentially photosensitivity triggering portion of the content on the secondary display, and ceasing to display the content on the secondary display after display of that content portion has concluded, thereby advantageously signaling the viewer that it is safe to return to viewing the content from the primary display. For example, an alert to switch viewing of the content to the secondary display or a signal to return to viewing the content from the primary display may be a buzz or other haptic effect on the wrist. In one implementation, for instance, the alert to switch viewing of the content to the secondary display could be multiple short buzzes or audible beeps, while the signal to return to viewing the content from the primary display. In addition to the foregoing, it is noted that the present photosensitivity mitigation solution may advantageously be implemented as automated systems and methods.

As used in the present application, the terms "automation," "automated," and "automating" refer to systems and processes that do not require the participation of a human system operator. Although, in some implementations, a system operator or administrator may review or even adjust the performance of the automated systems and according to the automated methods described herein, that human involvement is optional. Thus, the methods described in the present application may be performed under the control of hardware processing components of the disclosed automated systems.

FIG. 1 shows a diagram of use environment 100 in which photosensitivity mitigation during display of content is performed, according to one implementation. As shown in FIG. 1, use environment 100 can include content playout control system 102 having hardware processor 104 and memory 106 implemented as a computer-readable non-transitory storage medium storing software code 120 and content database 110. As further shown in FIG. 1, content database 110 includes content 154 being displayed by content playout control system 102 on primary display 152, and content portion 112 of content 154 determined to be a potential photosensitivity trigger for a viewer of content 154.

As also shown in FIG. 1, primary display 152 is situated in content viewing environment 150 occupied by viewers 156a and 156b possessing respective user systems 160a and 160b. In some implementations, as shown in FIG. 1, one or both of user systems 160a and 160b may be in communication with content playout control system 102 via communication network 130 and network communication links 132. As described in greater detail below by reference to FIGS. 2A, 2B, 2C, and 3, each of user systems 160a and 160b includes at least a hardware processor, a system memory, a transceiver, and a display (the display of either of user systems 160a and 160b hereinafter referred to as a "secondary display").

In some implementations, content viewing environment 150 may take the form of an indoor venue. Such indoor venues may include a cinema or home theater, for example. Alternatively, in some implementations, content viewing environment 150 may take the form of an outdoor venue such as an open air sports arena or stadium, or a drive-in movie theater.

Regarding photosensitivity reactions by a viewer, such as viewers 156a and 156b, it is noted that such a reaction may be triggered by certain transitions in the images shown during the display of content 154 on primary display 152. Those transitions may include contrast of light and dark, so that viewing bright content in content viewing environment 150 while content viewing environment 150 is in darkness or near darkness may increase the likelihood of a photosensitivity reaction. Other potential photosensitivity reaction triggers include patterns of flashes, certain combinations of flashing colors, specific frequencies of flashes or colors, and moving patterns of flashes or colors. Moreover, the likelihood that a photosensitivity reaction may be triggered by any of the foregoing visual effects is increased when they are observed on a display having a large screen size, such as a movie screen in a cinema or other entertainment venue, or even a big screen home theater display, such as a display having an eighty-five inch (85"), one hundred and twenty inch (120"), or one hundred and fifty inch (150") display screen, for example.

According to the exemplary implementation shown by FIG. 1, either or both of viewers 156a and 156b may utilize respective user systems 160a and 160b to determine, while content 154 is being displayed on primary display 152, that content portion 112 of content 154, which is about to be displayed on primary display 152, may trigger a photosensitivity reaction by one or both of viewers 156a and 156b. In use cases in which content portion 112 is a potential trigger for both of viewers 156a and 156b, user systems 160a and 160b are configured to generate an alert prompting respective viewers 156a and 156b to temporarily view content portion 112 of content 154 from a secondary display provided by or controlled by respective user systems 160a and 160b and having a reduced screen size relative to primary display 152.

It is noted that the determination that content portion 112 of content 154 may trigger a photosensitivity reaction may be individual to each of viewers 156a and 156b, and may be based at least in part on preferences of viewers 156a and 156b, user profiles of viewers 156a and 156b, or preferences and user profiles of viewers 156a and 156b. Thus, in various use cases, content portion 112 may result in neither of viewers 156a or 156b being alerted to temporarily view content portion 112 from a secondary display, both of viewers 156a and 156b being so alerted, or one or the other but not both of viewers 156a and 156b being alerted.

Content 154 may be or include video unaccompanied by audio, or may be or include audio-video (AV) content, such as a movie, television (TV) programming content, or a video game, to name a few examples. In some use cases in which content 154 includes AV content, the determination that content portion 112 that is about to be displayed on primary display 152 may trigger a photosensitivity reaction may be based on audio included as part of content 154. Alternatively, in some implementations, the determination that content portion 112 that is about to be displayed on primary display 152 may trigger a photosensitivity reaction may be based on a photosensitivity testing algorithm executed by user systems 160a and 160b on a respective copy of content 154 stored on each of user systems 160a and 160b. As another alternative, the determination that content portion 112 that is about to be displayed on primary display 152 may trigger a photosensitivity reaction may be based on receiving a wireless data signal from content playout control system 102 via communication network 130 and network communication links 132. It is noted that although FIG. 1 depicts user systems 160a and 160b as being in wireless communication with content playout control system 102, that representation is merely exemplary. In some alternative implementations, one or both of user systems 160a and 160b may be communicatively coupled to content playout control system via a wired connection, such as by being "plugged in" to a respective cinema seat occupied by each of viewers 156a and 156b. Thus, in some implementations the determination that content portion 112 that is about to be displayed on primary display 152 may trigger a photosensitivity reaction may be based on receiving a data signal from content playout control system 102 via a wired connection. Moreover, it is further noted that in various use cases, any combination of the above-described modalities for determining that content portion 112 that is about to be displayed on primary display 152 may trigger a photosensitivity reaction may be employed.

It is noted that communication network 130 may be a packet-switched network such as the Internet, for example. Alternatively, communication network 130 may be another type of wide area network (WAN), a local area network (LAN), or any type of private or limited distribution network. In addition, or alternatively, in some implementations, communication network 130 may support a local area broadcast method, such as User Datagram Protocol (UDP) or Bluetooth, for instance. Moreover, in some implementations, communication network 130 may be a high-speed network suitable for high performance computing (HPC), for example a 10 GigE network or an Infiniband network.

Figure 2A:
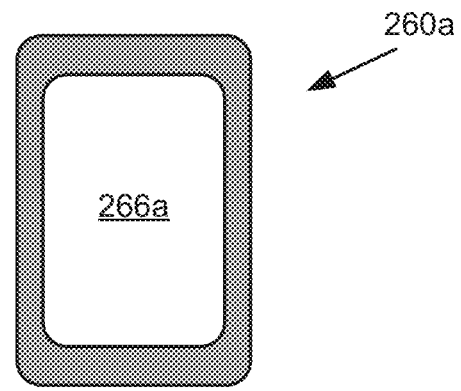
FIG. 2A shows an exemplary system providing photosensitivity mitigation during display of content, according to one implementation.
Figure 2B:
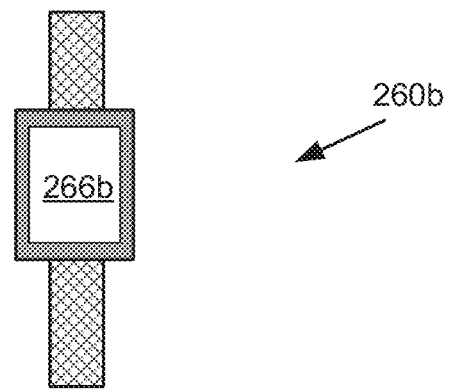
FIG. 2B shows an exemplary system providing photosensitivity mitigation during display of content, according to another implementation.
Figure 2C:
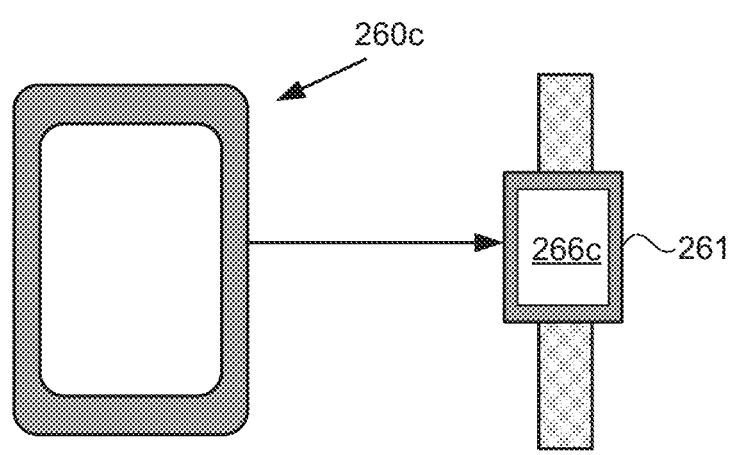
FIG. 2C shows an exemplary system providing photosensitivity mitigation during display of content, according to yet another implementation.

Referring to FIGS. 2A, 2B, and 2C, those figures show specific exemplary implementations of user systems providing photosensitivity mitigation during display of content. As shown by FIG. 2A, in some implementations user system 260a may take the form of a handheld device, such as a smartphone or tablet computer including secondary display 266a integrated with user system 260a. Alternatively, and as shown by FIG. 2B, in some implementations user system 260b may take the form of a wearable device, such as a smartwatch for example, including secondary display 266b integrated with user system 260b. As another alternative, and as shown by reference to FIG. 2C in combination with FIG. 1, in some implementations user system 260c may be configured to communicate with secondary device 261 to cause secondary display 266c of secondary device 261 that is separate from user system 260c to display content portion 112 to a viewer utilizing user system 260c and secondary device 261.

Any of user systems 260a, 260b, and 260c may correspond in general to either or both of user systems 160a and 160b, in FIG. 1. Consequently, user system 160a and 160b may share any of the characteristics attributed to user systems 260a, 260b, or 260c by the present disclosure, and vice versa. That is to say, user systems 160a and 160b may include a secondary display for displaying content portion 112 that is integrated with user systems 160a and 160b, or may be in communication with secondary device 261 including a secondary display for displaying content portion 112 that is separate from user systems 160a and 160b.

Figure 3:
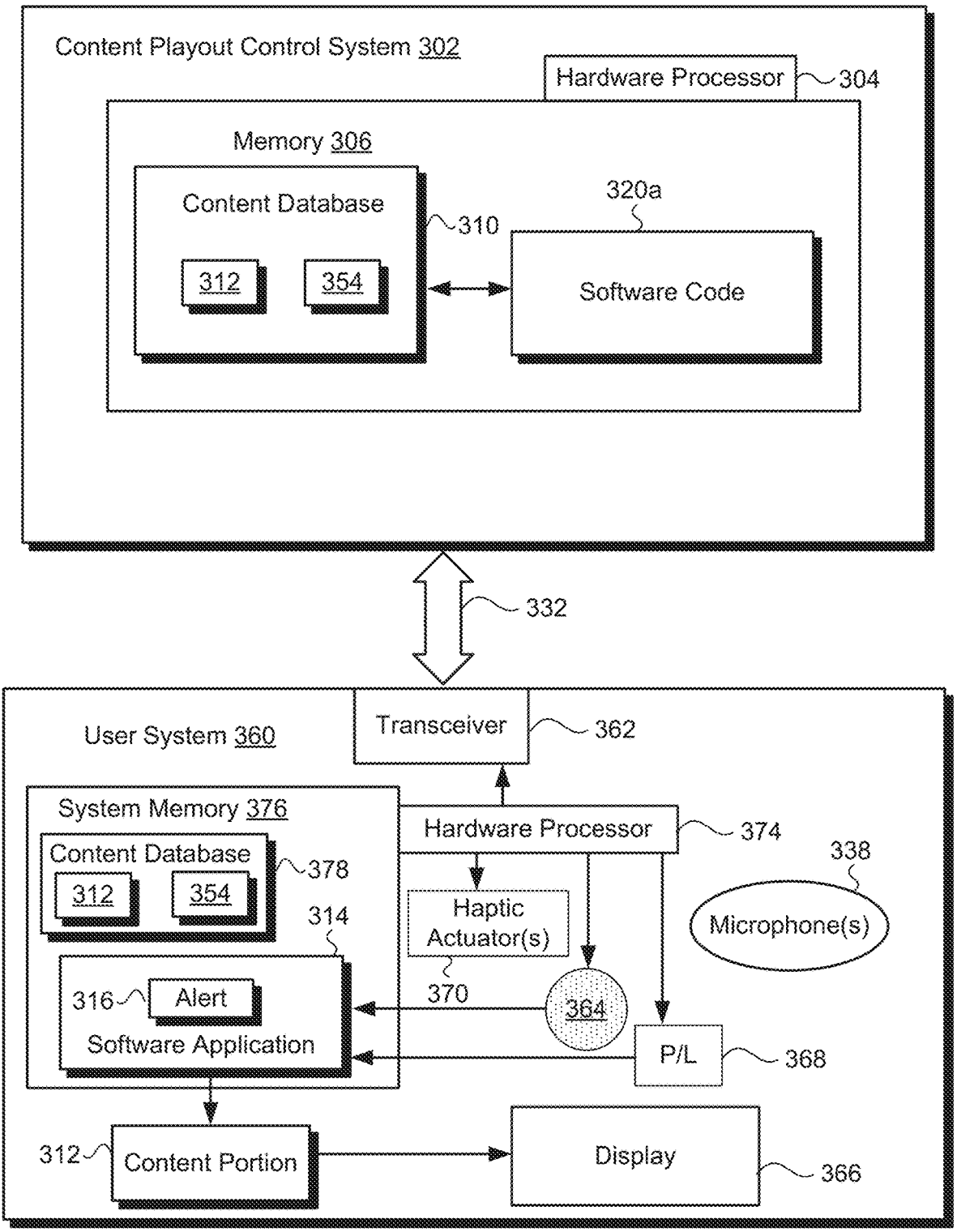
FIG. 3 shows a more detailed example of a user system configured to provide photosensitivity mitigation during display of content, according to one implementation.

FIG. 3 shows another exemplary implementation of a user system for providing photosensitivity mitigation during display of content. According to the exemplary implementation shown in FIG. 3, user system 360 is interactively connected to content playout control system 302 over network communication link 332.

As shown in FIG. 3, user system 360 includes hardware processor 374 and system memory 376 implemented as a computer-readable non-transitory storage medium storing software application 314. As further shown in FIG. 1, in some implementations system memory 376 may optionally store content database 378 including one or both of content 354 and content portion 312 of content 354 determined to be a potential photosensitivity trigger for a viewer of content 354. In addition, user system 360 includes transceiver 362, display 366, and may further include one or more cameras 364 (hereinafter "camera(s) 364"), one or more position/location sensors 368 (hereinafter "P/L sensor(s) 368"), one or more haptic actuators 370 (hereinafter "haptic actuator(s) 370"), one or more microphones 338 (hereinafter "microphone(s) 338"), or a combination thereof. An alert 316 may be generated by software application 314.

It is noted that in implementations in which one or both of content 354 and content portion 312 of content 354 are stored locally on user system 360, content 354 and content portion 312 are stored securely, such as by being encrypted for example. In addition, in implementations in which one or both of content 354 and content portion 312 are displayed on user system 360, content 354 and content portion 312 are displayed securely, subject to digital rights management for example. It is further noted that in some implementations, one or both of content 354 and content portion 312 may be geo-location locked to ensure that display of content 354 and content portion 312 is restricted to an approved venue, such as a cinema.

As also shown in FIG. 1, content playout control system 302 includes hardware processor 304 and memory 306 implemented as a computer-readable non-transitory storage medium storing software code 320 and content database 310 including content 354 and content portion 312 of content 154 determined to be a potential photosensitivity trigger for a viewer of content 354. Network communication link 332 and content playout control system 302 including hardware processor 304 and memory 306 storing software code 320 and content database 310 including content 354 and content portion 312 correspond respectively in general to network communication links 132 and content playout control system 102 including hardware processor 104 and memory 106 storing software code 120 and content database 110 including content 154 and content portion 112. Thus, network communication links 132 and content playout control system 102 may share any of the characteristics attributed to respective network communication link 332 and content playout control system 302 by the present disclosure, and vice versa.

User system 360 can correspond in general to any of user systems 160a/160b/260a/260b/260c, in FIGS. 1, 2A, 2B, and 2C. Thus, user systems 160a/160b/260a/260b/260c may share any of the characteristics attributed to user system 360 by the present disclosure, and vice versa. That is to say, in addition to the features attributed to user systems 160a/160b/260a/260b/260c above, each of user systems 160a/160b/260a/260b/260c may include features corresponding respectively to hardware processor 374, system memory 376 storing software application 314 and optionally storing content database 378 including one or both of content 354 and content portion 312, transceiver 362, and may further include camera(s) 364. P/L sensor(s) 368"), haptic actuator(s) 370, and microphone(s) 338.

Although the present application refers to software application 314 and optional content database 378 as being stored in system memory 376 of user system 360 for conceptual clarity, more generally, system memory 376 may take the form of any computer-readable non-transitory storage medium. The expression "computer-readable non-transitory storage medium," as used in the present application, refers to any medium, excluding a carrier wave or other transitory signal that provides instructions to hardware processor 374 of user system 360. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Hardware processor 374 of use system 360 may include multiple hardware processing units, such as one or more central processing units, one or more graphics processing units, and one or more tensor processing units, one or more field-programmable gate arrays (FPGAs), custom hardware for machine-learning training or inferencing, and an API server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of system 100, as well as a Control Unit (CU) for retrieving programs, such as software application 314, from system memory 376, while a GPU may be implemented to reduce the processing overhead of the CPU by performing computationally intensive graphics or other processing tasks. A TPU is an application-specific integrated circuit (ASIC) configured specifically for AI processes such as machine learning.

Transceiver 362 of user system 360 may be implemented as any suitable wireless communication unit. For example, transceiver 362 may be implemented as a fourth generation (4G) wireless transceiver, or as a 5G wireless transceiver. In addition, or alternatively, transceiver 362 may be configured for communications using one or more of Wireless Fidelity (Wi-Fi), Worldwide Interoperability for Microwave Access (WiMAX), Bluetooth, Bluetooth low energy, ZigBee, radio-frequency identification (RFID), near-field communication (NFC), and 60 GHz wireless communications methods.

Camera(s) 364 may include one or more still image cameras, one or more video cameras, or one or more still image cameras and one or more video cameras. Moreover, in some implementations, camera 364 may correspond to an array of still image cameras, video cameras, or both, configured to generate a panoramic image.

As shown in FIGS. 2A and 2B, in some implementations secondary display 266a/266b may take the form of a display integrated with user system 260a/260b/360. Alternatively, and as shown by FIG. 2C, in some implementations secondary display 266c may be a feature of secondary device 261 and may be separate from user system 260c. Insofar as user system 360 corresponds to any of user systems 260a/260b/260c, display 366 of user system 360 (hereinafter "secondary display 366") corresponds in general to displays 266a/266b/266c and thus may be integrated with user system 360, as shown in FIG. 3, or may be separate from user system 360. It is noted that secondary display 266a/266b/266c/366 may be implemented as a liquid crystal display (LCD), a light-emitting diode (LED) display, an organic light-emitting diode (OLED) display, a quantum dot (QD) display, or any other suitable display screen that performs a physical transformation of signals to light.

P/L sensor(s) 368 may include one or more accelerometers, and/or gyroscopes, and/or a GPS receiver, and/or a magnetometer, for example. In some implementations. P/L sensor(s) 368 may be implemented as an inertial measurement unit (IMU), as known in the art. Microphone(s) 338 may include one or more electret condenser microphones or other microelectromechanical system (MEMs) microphones. Haptic actuator(s) 370 may include one or more features configured to produce mechanical effects, such as vibrations or directed forces for example.

According to the exemplary implementation shown in FIG. 3, software application 314 is located in system memory 376 of user system 360, having been received from content playout control system 302 or a third party distributor of software application 314 via network communication link 332. Alternatively, software application may be transferred to system memory 376 from a computer-readable non-transitory storage medium external to user system 360, such as a flash drive. Once transferred, for instance by being downloaded over network communication link 132/332, software application 314 may be persistently stored in system memory 376 and may be executed locally on user system 360 by hardware processor 374.

The functionality of software application 314 will be further described by reference to FIG. 4 in combination with FIGS. 1, 2A, 2B, 2C, and 3. FIG. 4 shows flowchart 480 presenting an exemplary method for use by a system to provide photosensitivity mitigation during display of content, according to one implementation. With respect to the method outlined in FIG. 4, it is noted that certain details and features have been left out of flowchart 480 in order not to obscure the discussion of the inventive features in the present application.

Referring to FIG. 4 in combination with FIGS. 1, 2A. 2B, 2C, and 3, the method outlined by flowchart 480 includes, while content 154/354 is being displayed on primary display 152 for viewing by a viewer, determine that a portion of content 154/354. i.e., content portion 112/312 that is about to be displayed on primary display 152 may trigger a photosensitivity reaction by the viewer (action 481). As noted above, content 154/354 may be or include video unaccompanied by audio, or may be or include AV content, such as a movie. TV programming content, or a video game, to name a few examples.

The determination that content portion 1121312 that is about to be displayed on primary display 152 may trigger a photosensitivity reaction may be based data previously received from content playout control system 102/302. By way of example, in some implementations content playout control system 102 may be in possession of results of a photosensitivity testing algorithm run on content 154/354, when executed either by hardware processor 104/304 of content playout control system 102/302, an owner or distributor of content 154/354, or a third party provider of such photosensitivity testing. In those use cases, those photosensitivity results may be synchronized with the timeline and audio track of content 154/354, in which case one or more of a frame number, timestamp, or audio segment substantially aligned with the beginning of content portion 112/312 may be transmitted to user system 160a/160b/260a/260b/260c/360 prior to initiating display of content 154/354 on primary display 152. Thus, in some use cases in which content 154/354 includes AV content, the determination that content portion 112/312 that is about to be displayed on primary display 152 may trigger a photosensitivity reaction may be based on audio included as part of content 154/354 and received by microphone(s) 338 of user system 160a/160b/260a/260b/260c/360.

Synchronization may also be performed from a Digital Cinema Package (DCP) itself when the DCP includes sign language assistance or other captioning and broadcasts its timecode out onto the local network for user system 160a/160b/260a/260b/260c/360 to receive. Another way to synchronize may include having the a viewer, such a one or both of viewers 156a and 156b, wear a headset with a camera pointed at primary display 152 that can match the timecode as well. As yet another alternative, a viewer may manually press "start" on a timer of user system 160a/160b/260a/260b/260c/360 and the alerts would be generated based on elapsed time.

Alternatively, in some implementations, the determination that content portion 112/312 that is about to be displayed on primary display 152 may trigger a photosensitivity reaction may be based on the same or another photosensitivity testing algorithm executed by user system 160a/160b/260a/260b/260c/360 on a copy of content 154/354 stored on user system 160a/160b/260a/260b/260c/360. It is noted that in implementations in which a copy of content 154/354 is stored on user system 160a/160b/260a/260b/260c/360, that copy may bear a digital watermark or other digital insignia for constraining unauthorized copying or use of content 154/354.

As another alternative, the determination that content portion 112/312 that is about to be displayed on primary display 152 may trigger a photosensitivity reaction may be based on receiving a wireless data signal from content playout control system 102/302 via communication network 130 and network communication links 132/332 immediately preceding display of content portion 112/312 on primary display 152. However, as noted above, in some implementations one or both of user systems 160a and 160b may be communicatively coupled to content playout control system via a wired connection, such as by being "plugged in" to a respective cinema seat occupied by each of viewers 156a and 156b. Thus, in some implementations the determination that content portion 112 that is about to be displayed on primary display 152 may trigger a photosensitivity reaction may be based on receiving a data signal from content playout control system 102 via a wired connection. Moreover, it is noted that in various use cases, any combination of the above-described modalities for determining that content portion 112/312 that is about to be displayed on primary display 152 may trigger a photosensitivity reaction may be employed.

Action 481 may be performed by software application 314, executed by hardware processor 374 of user system 160a/160b/260a/260b/260c/360. As noted above, in various implementations, user system 160a/160b/260a/260b/260c/360 may comprise one of a smartphone, a tablet computer, or a wearable device such as a smartwatch, for example.

Continuing to refer to FIG. 4 in combination with FIGS. 1, 2A. 2B, 2C, and 3, in some implementations flowchart 480 may further include obtaining content portion 112/312 (action 482). It is noted that action 482 is optional, because in some implementations, user system may receive content portion 112/312 as part of a wireless data signal received from content playout control system 102/302 in action 481. However, in other implementations, user system 160a/160b/260a/260b/260c/360 may affirmatively obtain content portion 112/312 from content database 110/310 of content playout control system 102/302. Alternatively, in implementations in which a copy of content 154/354 is stored on user system 160a/160b/260a/260b/260c/360, content portion 312 may be obtained from content database 378 of user system 160a/160b/260a/260b/260c/360. Action 482, when included in the method outlined by flowchart 480, may be performed by software application 314, executed by hardware processor 374 of user system 160a/160b/260a/260b/260c/360.

Continuing to refer to FIG. 4 in combination with FIGS. 1, 2A, 2B, 2C, and 3, flowchart 480 further includes generating alert 316 to the viewer to switch viewing content 154/354 from primary display 152 to viewing content 154/354 from secondary display 266a/266b/266c/366 (action 483). Alert 316 may take the form of a buzz, vibration, or directed force produced by haptic actuator(s) 370 of user system 160a/160b/260a/260b/260c/360, for example. Alternative, alert 316 may take the form of a flashing light or other visual cue displayed on secondary display 266a/266b/266c/366, or an audio alert output by user system 160a/160b/260a/260b/260c/360. Generation of alert 316, in action 483, may be performed by software application 314, executed by hardware processor 374 of user system 160a/160b/260a/260b/260c/360.

Continuing to refer to FIG. 4 in combination with FIGS. 1, 2A, 2B, 2C, and 3, flowchart 480 further includes displaying content portion 112/312 on secondary display 266a/266b/266c/366 (action 484). It is noted that action 484 may result in content portion 112/312 being displayed on secondary display 266a/266b/266c/366 in real-time, i.e., contemporaneously with the display of content portion 112/312 on primary display 152. However, in some use cases, such as at home use for example, display of content 154/354 on primary display 152 may be temporarily suspended during display of content portion 112/312 on secondary display 266a/266b/266c/366. Whether or not display of content 154/354 on primary display 152 is temporarily suspended during display of content portion 112/312 on secondary display 266a/266b/266c/366, action 484 is performed with substantially no latency relative to the display of content 154/354 on primary display 152 such that the viewing experience is seamless when switching viewing between primary display 152 and second display 266a/266b/266c/366.

As described above by reference to FIG. 2A, in some implementations user system 160a/160b/260a/360 may take the form of a handheld device, such as a smartphone or tablet computer including secondary display 266a/366 integrated with user system 160a/160b/260a/360. Alternatively, and as described above by reference to FIG. 2B, in some implementations user system 160a/160b/260b/360 may take the form of a wearable device, such as a smartwatch for example, including secondary display 266b/366 integrated with user system 160a/160b/260b/360. As another alternative, and as described above by reference to FIG. 2C, in some implementations user system 160a/160b/260b/360 may be configured to communicate with secondary device 261 to cause secondary display 266c of secondary device 261 that is separate from user system 160a/160b/260b/360 to display content portion 112/312.

As also noted above, primary display 152 is may be a display having a large screen size, such as a movie screen in a cinema or other entertainment venue, or even a big screen home theater display, such as a display having an 85", 120", or 150" display screen, for example. By contrast, secondary display 266a/266b/266c/366 in the form or a smartphone, tablet computer, or wearable device is a reduced screen size display relative to primary display 152, thereby advantageously reducing the likelihood that a viewer of content portion 112/312 on secondary display 266a/266b/266c/366 would experience a photosensitivity reaction.

In some implementations, content portion 112/312 may be identical when shown on primary display 152 and secondary display 266a/266b/266c/366. In those implementations the likelihood that the viewer of content segment 112/312 on secondary display 266a/266b/266c/366 would experience a photosensitivity reaction is reduced due to the reduced size of secondary display 266a/266b/266c/366 relative to primary display 152. However, in some implementations content portion 112/312 may be modified to have a less triggering effect. By way of example, instead of a rapid flashing frequency of content segment 112/312 when shown on primary display 152, content segment 112/312 shown on secondary display 266a/266b/266c/366 may have its flashing frequency reduced, in addition to being shown on a smaller screen. The displaying of content portion 112/312 on secondary display 266a/266b/266c/366, in action 484, may be performed by software application 314, executed by hardware processor 374 of user system 160a/160b/260a/260b/260c/360.

In some implementations, the method outlined by flowchart 480 may conclude with action 484. However, in other implementations, as shown by FIG. 4, flowchart 480 may further include, after displaying content portion 112/312 on secondary display 266a/266b/266c/366, cease displaying content 154/354 on secondary display 266a/266b/266c/366 (action 485). As noted above, ceasing to display content 154/354 on secondary display 266a/266b/266c/366 after display of content portion 112/312 has concluded signals to the viewer that it is safe to return to viewing content 154/354 from primary display 152. Ceasing displaying of content 154/354 on secondary display 266a/266b/266c/366 after displaying content portion 112/312 on secondary display 266a/266b/266c/366, in action 485, may be performed by software application 314, executed by hardware processor 374 of user system 160a/160b/260a/260b/260c/360.

With respect to the method outlined by flowchart 480, it is noted that, in various implementations, actions 481, 483, and 484, or actions 481, 483, 484, and 485, or actions 481, 482, 483, and 484 (hereinafter "actions 481-484, or actions 481-484 and 485, may be performed in an automated process from which human participation may be omitted.

Thus, the present application discloses systems and methods for providing photosensitivity mitigation for a viewer during display of content. The present photosensitivity mitigation solution advances the state-of-the-art by determining, while content is being displayed on a primary display, that a portion of that content that is about to be displayed on the primary display may trigger a photosensitivity reaction by the viewer, and generate an alert prompting the viewer to temporarily view the content from a secondary display having a smaller screen size. The present solution further includes displaying the potentially photosensitivity triggering portion of the content on the secondary display, and ceasing to display the content on the secondary display after display of that content portion has concluded, thereby advantageously signaling the viewer that it is safe to return to viewing the content from the primary display.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a hardware processor
a system memory storing a software application;
the hardware processor configured to execute the software application to:
  while content is being displayed on a primary display for viewing by a viewer, determine that a portion of the content that is about to be displayed on the primary display may trigger a photosensitivity reaction by the viewer;
  in response to determining that the portion of the content may trigger the photosensitivity reaction by the viewer, generate an alert to the viewer to switch viewing the content from the primary display to viewing the content from a secondary display; and
  after generating the alert and in response to determining that the portion of the content may trigger the photosensitivity reaction by the viewer, display the portion of the content on the secondary display.

2. The system of claim 1, wherein the secondary display has a reduced screen size relative to the primary display, and wherein the portion of the content is displayed on the secondary display in a manner that is less likely to trigger the photosensitivity reaction by the viewer.

3. The system of claim 1, wherein determining that the portion of the content that is about to be displayed on the primary display may trigger the photosensitivity reaction is based on receiving an audio input.

4. The system of claim 1, wherein determining that the portion of the content is about to be displayed on the primary display may trigger the photosensitivity reaction is based on receiving a data signal wirelessly or via a wired connection.

5. The system of claim 1, wherein the photosensitivity reaction includes at least one of epilepsy, seizure, dizziness, vertigo, nausea or headache.

6. The system of claim 1, wherein the hardware processor is further configured to execute the software application to:
after displaying the portion of the content on the secondary display, cease displaying the content on the secondary display.

7. The system of claim 1, wherein the hardware processor is further configured to execute the software application to:
obtain the portion of the content from a playout control system displaying the content on the primary display.

8. The system of claim 1, wherein the content is a video, and wherein the hardware processor is further configured to execute the software application to:
suspend displaying the video on the primary display while displaying the portion of the video on the secondary display.

9. The system of claim 1, wherein the portion of the content includes at least one of rapidly shifting visual effects or patterns of flashes or colors.

10. A method for use by a system including a hardware processor and a system memory storing a software application, the method comprising:
determining, by the software application executed by the hardware processor while content is being displayed on a primary display for viewing by a viewer, that a portion of the content that about to be displayed on the primary display may trigger a photosensitivity reaction by the viewer;
in response to determining that the portion of the content may trigger the photosensitivity reaction by the viewer, generating, by the software application executed by the hardware processor, an alert to the viewer to switch viewing the content from the primary display to viewing the content from a secondary display; and
after generating the alert and in response to determining that the portion of the content may trigger the photosensitivity reaction by the viewer, displaying, by the software application executed by the hardware processor, the portion of the content on the secondary display.

11. The method of claim 10, wherein the secondary display has a reduced screen size relative to the primary display, and wherein the portion of the content is displayed on the secondary display in a manner that is less likely to trigger the photosensitivity reaction by the viewer.

12. The method of claim 10, wherein determining that the portion of the content that is about to be displayed on the primary display may trigger the photosensitivity reaction is based on receiving an audio input.

13. The method of claim 10, wherein determining that the portion of the content that is about to be displayed on the primary display may trigger the photosensitivity reaction is based on receiving a data signal wirelessly or via a wired connection.

14. The method of claim 10, wherein the photosensitivity reaction includes at least one of epilepsy, seizure, dizziness, vertigo, nausea or headache.

15. The method of claim 10, further comprising:
after displaying the portion of the content on the secondary display, cease displaying the content on the secondary display.

16. The method of claim 10, further comprising:
obtaining the portion of the content from a playout control system displaying the content on the primary display.

17. The method of claim 10, wherein the content is a video, the method further comprising:
suspending the displaying of the video on the primary display while displaying the portion of the video on the secondary display.

18. The method of claim 10, wherein the portion of the content includes at least one of rapidly shifting visual effects or patterns of flashes or colors.

19. A system comprising:
a hardware processor
a system memory storing a software application;
the hardware processor configured to execute the software application to:
  while content is being displayed on a primary display for viewing by a viewer, determine that a portion of the content that is about to be displayed on the primary display may trigger a photosensitivity reaction, including a physiological response, by the viewer;

in response to determining that the portion of the content may trigger the photosensitivity reaction by the viewer, generate an alert to the viewer to switch viewing the content from the primary display to viewing the content from a secondary display; and after generating the alert and in response to determining that the portion of the content may trigger the photosensitivity reaction by the viewer, display the portion of the content on the secondary display.

20. The system of claim 19, wherein the physiological response by the viewer includes at least one of epilepsy, seizure, dizziness, vertigo, nausea or headache.

\* \* \* \* \*